3,806,548
METHOD FOR THE METHYLATION-HYDROXYLA-
TION OF CERTAIN AROMATIC UNSATURATED
COMPOUNDS
Michael A. Harpold, St. Albans, and Fedor Poppelsdorf, Charleston, W. Va., assignors to Union Carbide Corporation, New York, N.Y.
No Drawing. Filed Nov. 22, 1971, Ser. No. 201,211
Int. Cl. C07c 49/76
U.S. Cl. 260—592      7 Claims

ABSTRACT OF THE DISCLOSURE

Certain aromatic compounds having an unsaturated chain, such as styrene or derivatives thereof, are reacted with peracetic acid or mixtures containing peracetic acid to add the elements of a methyl radical and a hydroxyl radical to the unsaturated chain. For example, styrene can be converted to 1-phenyl-1-propanol and propiophenone.

BACKGROUND OF THE INVENTION

The reaction of styrene and its derivatives with peracetic acid to produce styrene oxide or the corresponding oxides of the derivatives is well known and has been carried out commercially for many years. What has not been heretofore known is that one can produce 1-phenyl-1-propanol and propiophenone by the addition of the elements of a methyl radical and a hydroxyl radical to styrene by the reaction of styrene with peracetic acid or mixtures of peracetic acid and acetic anhydride.

SUMMARY OF THE INVENTION

It has now been found that the unsaturated side chain of compounds such as styrene and derivatives thereof can be converted into saturated chains containing an additional carbon atom and an oxygen-containing group in the chain. The production of such compounds is achieved by the reaction of an unsaturated compound of the formula:

I 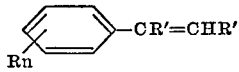

wherein R is alkyl or alkoxy of from 1 to 4 carbon atoms, $n$ is an integer from 0 to 2 and R' is hydrogen or alkyl of from 1 to 4 carbon atoms, with peracetic acid or mixtures of peracetic acid and acetic anhydride or mixtures of peracetic acid and acetyl peroxide under conditions which produce methyl radicals and hydroxyl radicals. The methyl radicals and hydroxyl radicals formed react with the unsaturated side chain —CR'=CHR', to produce a compound having a saturated side chain containing an additional carbon atom and an oxygen-containing group in the molecule such as compounds of the formulas:

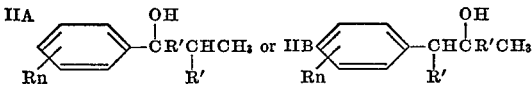

During this reaction some of the product of Formulas IIA and IIB undergoes further reaction to yield compounds having a ketonic carbonyl group of the formula:

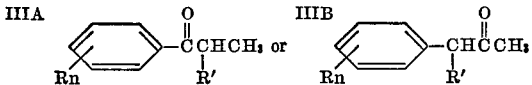

In addition, some oxide is formed as well as other by-products. At the end of the reaction, the desired compounds of Formulas IIA and B and IIIA and B are recovered by conventional distillation or fractionation methods. Also recovered are the oxide and other by-products.

The formation of the methyl radicals and hydroxyl radicals by the decomposition of the peracetic acid containing solution can be effected by various known means (for example, by heat, contact with transition metals, ultraviolet light, swirl-flow plasma arc, etc.). In a preferred embodiment, a solution of acetic anhydride in an inert solvent is heated to a temperature of from about 60° C. to about 120° C. To this solution is added the peracetic acid along with the compound of Formula I. Acetyl peroxide is generated and decomposes in situ, affording an efficient source of the methyl radicals; at the same time, the somewhat slower decomposition of peracetic acid in this temperature range allows for a source of hydroxyl radicals and an easily controlled hydroxylation reaction to yield the desired products. When ultraviolet light is used, the temperature of the reaction can be much lower, and can vary from about 10° C. to 50° C. The sequence of reactions is a novel manner of terminating the free radical reaction that has been initiated in the presence of additional polymerizable monomer. Ordinarily, such free radical reactions involving species such as styrene derivatives would proceed to high molecular weight polymers. It was therefor a completely unexpected and unobvious discovery to learn that under the conditions of this novel process the undesirable polymerization is, to a large extent, avoided and compounds of Formulas IIA and B and IIIA and B are produced in good yield from readily available and low cost starting materials.

Among the compounds having an unsaturated side chain that can be used as starting materials one can mention styrene, 4-methylstyrene, alpha-methyl-styrene, beta-methylstyrene, vinyltoluene, 2,4-dimethyl-styrene, p-isopropylstyrene, p-butylstyrene, 3,5-diethylstyrene, o-methoxystyrene, 4-methoxy-3-methylstyrene, 3,4-dimethoxystyrene, 2,3-dimethyl-alpha-methylstyrene, and the like.

The peracetic acid is commercially available as a solution in an inert organic solvent and is used as such. While the reaction can be carried out without the further addition of a solvent, it is preferably carried out in an organic solvent medium. Any suitable solvent can be used and illustrative thereof one can mention benzene, xylene, toluene, amyl acetate, ethyl acetate, etc.

The process is believed to initially produce a compound corresponding to Formula II. As heating and reaction continue, additional compound II is produced and simultaneously some of it is converted to a compound corresponding to Formula III. Thus, by control of reaction time, reaction temperature and reactant concentrations one can exercise some degree of control over the proportions of compounds of Formulas II and III produced during the reaction. These of course can be separated by conventional means at the conclusion of the reaction.

The amount of peracetic acid added to the reaction can vary from 1 mole to 10 moles per mole of unsaturated Compound I. It is preferably from 1 mole to 5 moles per mole thereof.

The reaction is preferably carried out by adding the peracetic acid reactant to a heated solution of the compound having the unsaturated side chain or by the simultaneous addition of the peracetic acid reactant and the compound having the unsaturated side chain to the heated organic solvent; acetic anhydride can be present in the reaction mixture. After all of the reactants are in the reaction vessel, the contents are stirred for an additional period up to several hours and then cooled and the products recovered.

It was further found that while some styrene oxide is produced when the initial compound charged is styrene that styrene oxide itself will not react with peracetic acid, acetyl peroxide or mixtures thereof. Styrene oxide is known to decompose when heated in the presence of peracetic acid or acetyl peroxide, but such decomposition does not produce 1-phenyl-1-propanol or propiophenone. It was also found that the use of a solution of acetyl peroxide and acetic acid in ethyl acetate does not convert styrene to 1-phenyl-1-propanol or propiophenone at reaction conditions of 100° C. for about one hour; this indicates that the presence of peracetic acid is necessary.

The following examples serve to illustrate the invention.

EXAMPLE I

A 500-ml. reaction flask was equipped with a reflux condenser, thermometer, magnetic stirring bar and two addition funnels. There were added to the flask 300 ml. of benzene and 10.2 grams of acetic anhydride and the solution was heated to the reflux temperature of 83° C. while stirring and continuously purging with nitrogen. Simultaneously, 125 grams of a 24.2 percent solution of peracetic acid in ethyl acetate and a solution of 10.4 grams of styrene in 40 ml. of benzene were added to the flask over a 65 minute period at the reflux temperature of the contents. The reaction mixture was stirred for an additional hour at reflux and cooled. Gas-liquid chromatographic analysis of the pale yellow solution, employing tridecane as the internal standard, showed conversion of styrene to contained yields of 30 percent 1-phenyl-1-propanol, 12.3 percent propiophenone and 28 percent styrene oxide. The compounds are separable by conventional separation procedures after destroying unreacted peracids with an acetaldehyde.

In a similar manner, three additional experiments were carried out; the details are set forth below:

| Run | A | B | C |
|---|---|---|---|
| Kettle charge: | | | |
| Benzene, ml | 300 | 500 | 1,500 |
| Acetic anhydride, g | 15.3 | 15.3 | 45.9 |
| Peracetic acid solution feed, g | 125 | 100 | 300 |
| Styrene feed: | | | |
| Styrene, g | 10.4 | 10.4 | 31.2 |
| Benzene, ml | 0 | 25 | 120 |
| Contained yields, percent: | | | |
| 1-phenyl-1-propanol | 25.6 | 33.9 | 30.6 |
| Propiophenone | 17.3 | 12.0 | 11.8 |
| Styrene oxide | 11.5 | 19.5 | 22.6 |

These four runs clearly establish the high yields of the desired products obtainable by the method of this invention (as compared to the yield of styrene oxide produced during the reaction). The reaction product of Run C, after treatment with acetaldehyde, was transferred to a distillation flask along with 50 ml. of amyl acetate and 17.5 grams of dioctyl phthalate were added as pot boiler. The mixture was distilled at 10 mm. mercury pressure and the fraction boiling at 92° C. to 97° C., which weighed 16.07 grams, analyzed as containing 98.22% of a mixture of 1-phenyl-1-propanol and propiophenone.

A mixture of 1-(4-methylphenyl)-1-propanol and p-methylphenyl ethyl ketone is produced by the substitution of p-methylstyrene for styrene.

EXAMPLE II

In a manner similar to that described in Example I, a mixture of 5 grams of a six-percent cobalt naphthenate solution in mineral spirits was added to 100 ml. of ethyl acetate and stirred at 80° C. to 86° C. while 20.8 grams of styrene and 200 ml. of a 25 percent solution of peracetic acid in ethyl acetate were added during a two hour period. Heating and stirring were continued for 20 minutes after completion of addition. Analysis of the reaction mixture by gas-liquid chromatographic analysis established the presence of 1-phenyl-1-propanol.

EXAMPLE III

A quartz reaction vessel consisting of a 450-watt Hanovia mercury ultraviolet lamp in a well surrounded by a cold water jacket was charged with 300 ml. of ethyl acetate. While bubbling nitrogen through the ethyl acetate, 10.4 grams of styrene and 100 grams of a 25 percent solution of peracetic acid in ethyl acetate were simultaneously added at about 20° C. over a 40-minute period while irradiating the mixture with ultraviolet light. The irradiation was continued for another 1.5 hours after the addition was complete and the reaction mixture was then analyzed for 1-phenyl-1-propanol, propiophenone and styrene oxide formation. In the mixture of these three products, the 1-phenyl-1-propanol was present as 48.7 percent thereof, the propiophenone as 27 percent thereof and the styrene oxide as only 24.3 percent thereof.

EXAMPLE IV

A reactor, equipped as described in Example I, was charged with 15.3 grams of acetic anhydride and 200 ml. of benzene; the solution was purged with nitrogen and heated to the reflux temperature of 87° C. While maintaining a reflux, a solution of 11.8 grams of beta-methyl-styrene in 40 ml. of benzene and 100 grams of a 24.2 percent peracetic acid solution in ethyl acetate were simultaneously added over a 50 minute period. Stirring and nitrogen purging were continued under a gentle reflux for another 1.5 hours. After destroying unreacted peracids, the mixture was analyzed by gas-liquid chromatography and by mass spectroscopy methods and it was established that 2-methyl-1-phenylpropanol, 3-phenyl-2-butanol, isopropyl phenyl ketone and 3-phenyl-2-butanone had been produced as the major products.

EXAMPLE V

In a manner similar to that described in Example IV, a solution of 11.6 grams of alpha-methyl-styrene in 100 ml. of benzene and 125 grams of a 25 percent peracetic acid solution in ethyl acetate were simultaneously added over a 70 minute period to a refluxing solution of 10.2 grams of acetic anhydride in 250 ml. of benzene. Stirring was continued at reflux for one hour and, after cooling to room temperature, the reaction mixture was analyzed by gas-liquid chromatography. The major products produced were 2-phenyl-2-butanol and alpha-methylstyrene oxide. A portion of the reaction mixture was further treated by preparative gas-liquid chromatographic means to separate the major components. It was found that 2-phenyl-2-butanol was present at a concentration twice as great as any other compound produced; it was a clear, colorless liquid, $n_D^{20}$ 1.5175. The product present in second largest quantity was the oxide.

EXAMPLE VI

In a manner similar to that described in Example IV, a solution of 11.8 grams of vinyl toluene in 100 ml. of ethyl acetate and 125 grams of a 25 percent peracetic acid solution in ethyl acetate were simultaneously added over a 65 minute period to a refluxing solution of 10.2 grams of acetic anhydride in 250 ml. of ethyl acetate. Stirring was continued at reflux for another 55 minutes and the reaction mixture was then cooled to room temperature and analyzed by gas-liquid chromatography and mass spectroscopy methods. The analysis showed that ethyltolylcarbinol and ethyl tolyl ketone were the two main products produced; they could be separated by preparative gas-liquid chromatography.

What is claimed is:

1. A method for the production of an aromatic compound having a saturated side chain, said saturated side chain having (i) an additional carbon atom and (ii) an additional oxygen-containing moiety from the group of hydroxyl or ketonic carbonyl which were not present in the original starting aromatic compound, which method comprises reacting at a temperature of between 60° C. and 120° C. a compound having an unsaturated side chain of the formula:

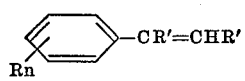

wherein R is alkyl or alkoxy of from 1 to 4 carbon atoms, $n$ is an integer of 0 to 2 and R' is hydrogen or alkyl of from 1 to 4 carbon atoms, with from 1 to 10 moles thereof of peracetic acid.

2. The method as claimed in claim 1, wherein the reaction is carried out in contact with acetic anhydride at a temperature of from 60° C. to 120° C.

3. The method as claimed in claim 1, wherein styrene is reacted with peracetic acid in contact with acetic anhydride at a temperature of from 60° C. to 120° C. to produce 1-phenyl-1-propanol and propiophenone.

4. The method as claimed in claim 1, wherein styrene is reacted with peracetic acid in contact with cobalt naphthenate at a temperature of from 60° C. to 120° C. to produce 1-phenyl-1-propanol and propiophenone.

5. The method as claimed in claim 1, wherein beta-methylstyrene is reacted with peracetic acid in contact with acetic anhydride at a temperature of from 60° C. to 120° C. to produce 2-methyl-1-phenyl-propanol, 3-phenyl-2-butanol, isopropyl phenyl ketone and 3-phenyl-2-butanone.

6. The method as claimed in claim 1, wherein alpha-methylstyrene is reacted with peracetic acid in contact with acetic anhydride at a temperature of 60° C. to 120° C. to produce 2-phenyl-2-butanol.

7. The method as claimed in claim 1, wherein vinyl toluene is reacted with peracetic acid in contact with acetic anhydride at a temperature of 60° C. to 120° C. to produce ethyltolylcarbinol and ethyl tolyl ketone.

References Cited

Tinsley, J. Org. Chem. 24, 1197–1199 (1959).

BERNARD HELFIN, Primary Examiner

J. H. REAMER, Assistant Examiner

U.S. Cl. X.R.

260—348.5, 613 D, 618 C; 204—162 R